United States Patent [19]

Baumgartner, Jr.

[11] Patent Number: 4,775,221
[45] Date of Patent: Oct. 4, 1988

[54] METHOD OF AND APPARATUS FOR CONTROLLING TEMPERATURE OF A LIQUID CRYSTAL CELL

[75] Inventor: James A. Baumgartner, Jr., San Jose, Calif.

[73] Assignee: Greyhawk Systems, Inc., Milpitas, Calif.

[21] Appl. No.: 914,343

[22] Filed: Oct. 2, 1986

[51] Int. Cl.[4] .......................... G02F 1/13; H05B 1/00
[52] U.S. Cl. ............................. 350/331 T; 350/351; 219/209; 219/210
[58] Field of Search ............. 350/351, 331 T; 357/25; 219/209, 210; 165/30

[56] References Cited

U.S. PATENT DOCUMENTS

| | | | |
|---|---|---|---|
| 3,410,999 | 11/1968 | Fergason et al. | 350/351 |
| 4,327,799 | 5/1982 | Scheiwe et al. | 165/30 |
| 4,386,836 | 6/1983 | Aoki et al. | 350/331 T |
| 4,584,461 | 4/1986 | Teshima et al. | 219/209 |

FOREIGN PATENT DOCUMENTS

| | | | |
|---|---|---|---|
| 0166247 | 10/1983 | Japan | 357/25 |
| 0202427 | 11/1983 | Japan | 350/331 T |
| 0219973 | 12/1984 | Japan | 372/34 |

Primary Examiner—Stanley D. Miller
Assistant Examiner—Trong Quang Phan
Attorney, Agent, or Firm—Flehr, Hohbach, Test, Albritton & Herbert

[57] ABSTRACT

Operating temperature of a liquid crystal cell is controlled by passing heated air on its surface, the heater for the air being operated according to the average temperature of the cell measured by a sensor. Fine control is effected by means of resistive heaters affixed on the exterior surface and by electrodes provided at strategic locations inside to pass current through a conductive layer.

13 Claims, 1 Drawing Sheet

METHOD OF AND APPARATUS FOR CONTROLLING TEMPERATURE OF A LIQUID CRYSTAL CELL

BACKGROUND OF THE INVENTION

This invention relates to a method of and apparatus for controlling temperature of a liquid crystal cell and more particularly to a method of and apparatus for both gross and fine temperature control of a liquid crystal cell used in an image projection apparatus.

It has been known to use liquid crystal cells in optical devices of various types. The art of creating images to be projected by using a smectic laser-addressed liquid crystal cell has been reviewed, for example, by Todd (Projection Display Devices, Society for Information Display, Seminar Lecture Notes, Vol. II, May 3, 1985). More recently, a method of and apparatus for forming and projecting high precision optical images by using a laser-addressed smectic liquid crystal cell have been disclosed in U.S. patent application Ser. No. 861,492 filed May 9, 1986 and assigned to the present assignee. In this and other such applications, it is demanded that the operating temperature of the liquid crystal cell be carefully controlled.

SUMMARY OF THE INVENTION

It is an object of the present invention to provide a method of controlling temperature of a liquid crystal cell.

It is another object of the present invention to provide a liquid crystal cell of which the operating temperature can be controlled.

The above and other objects of the present invention are achieved by placing the liquid crystal cell inside a recirculating duct and causing heated air to flow on the cell surface, air being heated by a heater controlled by an output from a temperature sensor which measures the average temperature of the cell. In addition, fine temperature control is effected by passing current through conductive layers in the cell and through strategically distributed resistive heaters attached to an external surface of the cell.

BRIEF DESCRIPTION OF THE DRAWINGS

The accompanying drawings, which are incorporated in and form a part of the specification, illustrate embodiments of the present invention and, together with the description, serve to explain the principles of the invention. In the drawings.

DETAILED DESCRIPTION OF THE INVENTION

Figure 1:
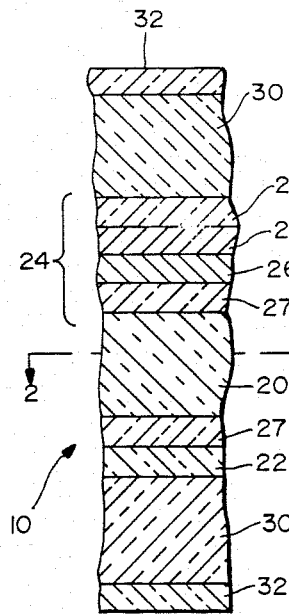
FIG. 1 is a cross-sectional view of a portion of a liquid crystal cell embodying the present invention for showing its cross-sectional structure.

The basic cross-sectional structure of a reflective liquid crystal cell to which a method and an apparatus embodying the present invention may be applied to control its temperature is schematically shown in FIG. 1. The cell 10 comprises a liquid crystal layer 20 sandwiched between alignment layers 27 and then between a transparent conductive layer 22 advantageously of indium-tin oxide and what may conveniently be referred to as an absorber-reflector 24 because it includes a chromium absorber layer 25 and an aluminum reflector layer 26 as well as an anti-reflectance coating 28. These layers are further sandwiched between transparent substrates 30, for example, of borosilicate glass each with an anti-reflectance coating layer 32.

Figure 2A:
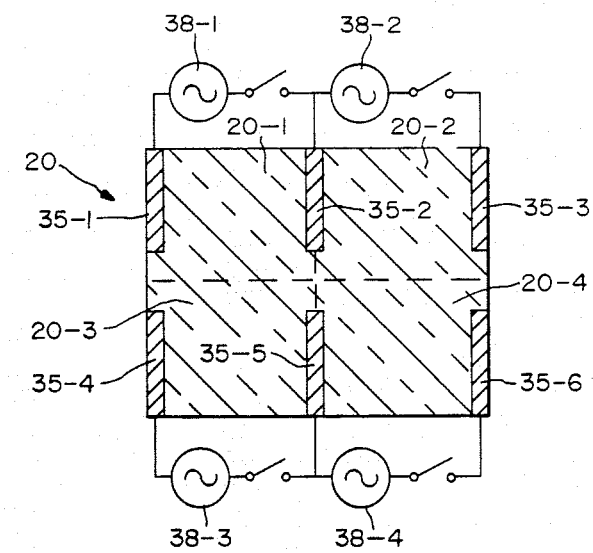
FIG. 2A and 2B are views taken along the line 2-2 of FIG. 1 according to two different embodiments of the present invention.
Figure 2B:
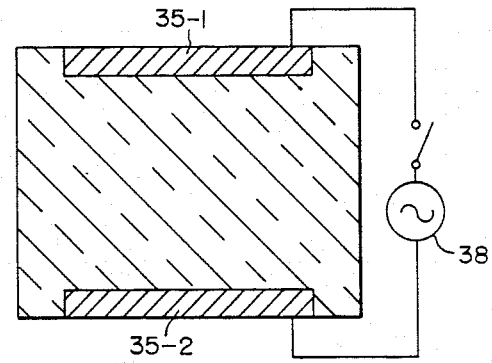

FIG. 2A is a plan view of the liquid crystal layer 20 taken along the line 2—2 of FIG. 1 designed as disclosed in U.S. patent application entitled "Liquid Crystal Cell for Image Projection and Method of Operating Same" which is being filed immediately before or concurrently with this application, is assigned to the present assignee and is herein incorporated by reference. The cell 10 according to this embodiment is characterized as having four separate quadrangular regions 20-1, 20-2, 20-3 and 20-4 defined on the liquid crystal layer 20 with six busbars 35-1, . . . , 35-6 attached to the aluminum layer 26 such that each region 20-1, 20-2, 20-3 or 20-4 lies substantially between mutually adjacent two of these busbars 35. Such pairs of busbars, each associated with one of the regions, are connected to A.C. sources 38-1, 38-2, 38-3 or 38-4 individually such that each region can be heated by closing the corresponding power circuit to pass a current pulse or pulses through the corresponding portion of the aluminum layer 26. The manner of dividing the cell 10 into regions as well as the number of regions, however, is not intended to limit the scope of the present invention. In particular, the cell 10 may include only one region. FIG. 2B is a sectional view taken along the line 2—2 of FIG. 1 for such a single-region cell. Parts corresponding or similar to those in Fig. 2A are indicated therein by identical numerals.

Figure 4:
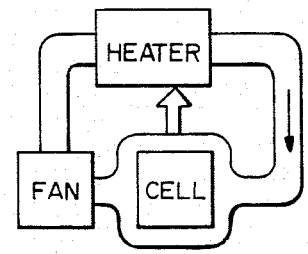
FIG. 4 is a schematic view of a duct for gross temperature control of a liquid crystal cell according to a method of this invention.
Figure 3:
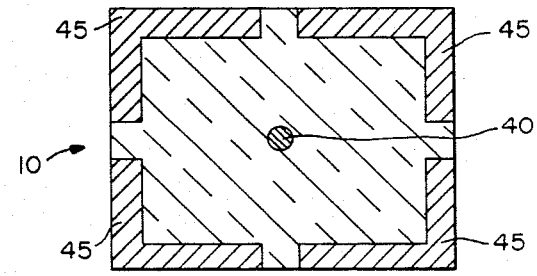
FIG. 3 is a plan view of the liquid crystal cell of FIG. 2A or FIG. 2B.

FIG. 3 is a plan view of the cell 10 of FIG. 2A or FIG. 2B exclusive of the power sources 38 and shows a temperature sensor 40 mounted at the center so as not to impair its performance. The temperature sensor 40 not only measures the average temperature of the cell 10 but also is adapted to transmit a signal indicative of the measured average temperature. The entire cell 10 is placed in a hot air recirculating duct of a known kind with a blower fan as schematically shown in FIG. 4. The temperature sensor 40 forms a part of a closed loop servo control system as symbolically indicated by an arrow to control the power dissipated in the heater and thereby vary the temperature of the air flowing over the cell 10 and ultimately control the temperature of the cell 10 itself.

FIG. 3 further shows resistive heating elements 45 affixed to the exterior surface of the cell 10 to cancel temperature non-uniformities which would otherwise result from the flow of air over the cell as described above, from non-uniform influx of energy to the cell by irradiation and from the heat escaping across the edge sections. If the cell 10 is of the type divided into regions as shown in FIG. 2A, it is preferable that these heating elements belonging to the individual regions be separately operable.

The foregoing description of the invention has been presented for purposes of illustration and description. It is not intended to be exhaustive or to limit the invention to the precise form disclosed, and many modifications and variations are possible in light of the above teaching. For example, temperature of a transmissive liquid crystal cell can be controlled similarly. The length of busbars shown in FIG. 2 and the positions of resistive heaters in Fig. 4 are not intended to limit the scope of the invention. In summary, such modifications and variations which may be apparent to a person skilled in the art are intended to be included within the scope of this invention.

What is claimed is:

1. A liquid crystal cell comprising
    a liquid crystal layer with a surface defining one or more individually temperature-controllable regions, said temperature-controllable regions defining boundary lines therebetween,
    a conductive layer which is substantially parallel and adjacent to said liquid crystal layer,
    elongated electrodes disposed on said conductive layer along said boundaries and/or outer edges of said liquid crystal layer such that each of said temperature-controllable regions has a pair of said electrodes on opposite sides thereof, and
    power means for applying a potential difference between selected one or more of said pairs of electrodes for passing a current and thereby heating the region therebetween.

2. The liquid crystal cell of claim 1 further comprising a temperature sensor for outputting a temperature signal indicative of the average temperature of said temperature-controllable cell.

3. A method of controlling the temperature of a liquid crystal cell which includes a conductive layer parallel to a surface thereof, one or more separate regions being defined on said surface, said method comprising the steps of
    providing electrodes on said conductive layer along boundaries between said regions and/or along outer edges of said conductive layer such that each of said regions has a pair of said electrodes on opposite sides thereof, and
    applying a potential difference between selected one or more of said electrodes to pass a current and thereby heat the region or regions between said selected one or more of said electrodes.

4. The method of claim 3 further comprising the step of causing heated air to flow controllably on said surface.

5. The method of claim 4 wherein said heated air is circulated inside a recirculating duct containing said liquid crystal cell.

6. The method of claim 4 wherein said heated air is controllably heated according to a signal indicative of the average temperature of said liquid crystal cell.

7. The method of claim 6 further comprising the step of placing a temperature sensor on said surface, said temperature sensor being connected to output said signal.

8. The method of claim 3 further comprising the step of causing current to pass through said conductive layer.

9. The method of claim 8 further comprising the step of attaching electrodes to said conductive layer at opposite edges of said one or more regions and causing current to flow between said electrodes.

10. The method of controlling the temperature of a liquid crystal cell, said method comprising the step of causing heated air to flow controllably on a surface of said liquid crystal cell.

11. The method of claim 10 wherein said heated air is circulated in a recirculating duct containing said liquid crystal cell.

12. The method of claim 10 wherein said heated air is controllably heated according to a signal indicative of the average temperature of said liquid crystal cell.

13. The method of claim 12 further comprising the step of placing a temperature sensor on said surface, said temperature sensor being connected to output said signal.

* * * * *